United States Patent
Siew et al.

(10) Patent No.: US 6,760,170 B2
(45) Date of Patent: Jul. 6, 2004

(54) SERVO TEST METHOD

(75) Inventors: LiangSin Siew, Singapore (SG); WaiKhay Chan, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 524 days.

(21) Appl. No.: 09/930,511

(22) Filed: Aug. 15, 2001

(65) Prior Publication Data
US 2002/0027729 A1 Mar. 7, 2002

Related U.S. Application Data

(60) Provisional application No. 60/225,249, filed on Aug. 15, 2000.

(51) Int. Cl.[7] .................. G11B 27/36; G11B 21/02
(52) U.S. Cl. .................. 360/31; 360/75; 360/77.04
(58) Field of Search .................. 360/31, 75, 77.04, 360/77.08, 77.06

(56) References Cited

U.S. PATENT DOCUMENTS

| | | |
|---|---|---|
| 5,241,433 A | 8/1993 | Anderson et al. |
| 5,444,583 A | 8/1995 | Ehrlich et al. |
| 5,457,587 A | 10/1995 | Suzuki |
| 5,539,714 A | 7/1996 | Andrews, Jr. et al. |
| 5,550,685 A | 8/1996 | Drouin |
| 5,585,976 A | 12/1996 | Pham |
| 5,608,586 A | 3/1997 | Sri-Jayantha et al. |
| 5,774,297 A | 6/1998 | Hampshire et al. |
| 5,926,388 A | 7/1999 | Jeon et al. |
| 5,930,068 A | 7/1999 | Gregg et al. |
| 5,978,169 A | 11/1999 | Woods |
| 6,049,440 A | 4/2000 | Shu |
| 6,069,764 A | 5/2000 | Morris et al. |
| 6,088,186 A | 7/2000 | Carlson |
| 6,141,175 A | 10/2000 | Nazarian et al. |
| 6,304,398 B1 * | 10/2001 | Gaub et al. .................. 360/49 |
| 6,510,017 B1 * | 1/2003 | Abdelnour ................ 360/77.04 |
| 6,563,663 B1 * | 5/2003 | Bi et al. .................. 360/77.04 |

FOREIGN PATENT DOCUMENTS

| | | |
|---|---|---|
| WO | WO 98/52195 | 11/1998 |

* cited by examiner

Primary Examiner—David Hudspeth
Assistant Examiner—Jason Olson
(74) Attorney, Agent, or Firm—Joseph R. Kelly; Westman, Champlin & Kelly, P.A.

(57) ABSTRACT

A servo test is performed on a disc drive. The servo test includes performing a position error sample (PES) threshold test on tracks in the disc drive and identifying those tracks that fail the PES servo sample test. Zero acceleration path (ZAP) learning is performed on the identified tracks, and is performed on less than all of the tracks on the disc drive. Another PES servo threshold test is performed on the identified tracks to determine whether they pass the servo test, given the ZAP learning process.

20 Claims, 3 Drawing Sheets

SERVO TEST METHOD

CROSS-REFERENCE TO RELATED APPLICATION

The present invention claims priority from provisional U.S. Patent Application No. 60/225,249 filed Aug. 15, 2000, entitled ADVANCED TEST TIME REDUCTION SCHEME.

FIELD OF THE INVENTION

The present invention relates to disc drives. More specifically, the present invention relates to a servo test used in certifying, or qualifying, a disc drive.

BACKGROUND OF THE INVENTION

Disc drives illustratively include data transducers located relative to disc surfaces of rotatable discs in a disc stack. The data transducers are provided with a write signal to encode data on the disc surface. When the disc surface is moved relative to the data transducer, the data transducer generates a read signal indicative of data which has already been encoded on the disc.

In order to write data to the disc, a servo system is used to position the data head at one of a plurality of concentric tracks on the disc surface. A disc drive controller then provides information which generates the write signal that is provided to the data transducer. The data transducer thus encodes data on the disc surface at the desired track location.

When a read operation is to be performed, the servo system again positions the data transducer relative to a desired track on the disc surface. The data transducer then generates a read signal indicative of information encoded on the track over which the data transducer is positioned. This information is provided back to the drive controller which identifies data based on the read signal received.

It can thus be seen that, in order to perform a read or write, the servo system must perform a track following operation. In a track following operation, the servo system holds the data transducer over a track on the disc surface, while the disc rotates, to read data from, or write data to, the disc surface. In order to access a desired portion of the disc surface, the servo system must perform a track seek operation. In the track seek operation, the servo system moves the data transducer radially relative to the disc surface to a desired one of the concentric tracks to be accessed.

Before disc drives are certified for sale by many manufactures, they are subjected to a variety of tests. A servo test is used by many manufactures as part of the hard disc drive certification test process. The servo test is used because the data transducer must be able to be positioned accurately relative to the track prior to storing data on and retrieving data from the disc.

There is a desire to obtain ever increasing storage capacity on disc drives. There is also a desire to reduce the size of disc drives. One of the ways in which both of these objectives are accomplished is to increase the number of tracks per inch (TPI) on the disc surface. Two of the known problems which must be overcome to increase tracks per inch are repeatable run-out (RRO) and non-repeatable run-out (NRRO). One of the sources for repeatable run-out can be eccentric rotation of the disc drive spindle which can be caused by mechanical misalignments or tolerance stack up, or which can be caused by excitation of resonant modes in the disc drive. RRO can cause position error samples (PES) to be written in the wrong position and lead to positioning the data transducer off of the track center.

One of the technologies used to address this written in repeatable run-out, and thus to increase TPI, is referred to as zero acceleration path (ZAP) learning. Zap learning is known, and need not be fully recounted here. Briefly, however, ZAP learning involves an extended learning process in which a highly accurate positioning system detects repeatable run-out and writes in position error information in order to compensate for the repeatable run-out for subsequent servo positioning during operation of the disc drive. However, ZAP learning takes a long time, typically on the order of several hours, depending upon the number of discs in the drive. This is because ZAP learning may require many revolutions per track. ZAP learning can also be highly susceptible to external vibrations and non-repeatable run-out. In other words, when the disc drive is subjected to external vibrations and non-repeatable run-out, ZAP learning may inadvertently result in a disc drive that exhibits worse servo performance than one which was not subjected to ZAP learning at all.

In current products, the servo test is broken into several parts. All the surfaces are first scanned for bad tracks with a very loose position error sample (PES) threshold. Bad tracks are identified and avoided. This can take in excess of two hours. ZAP learning is then performed on all the tracks. This can take in excess of five hours. After ZAP learning has been performed on all the surfaces, all the surfaces are again scanned for bad servo sectors, with a tighter PES threshold than that used during the first scan. This can also take in excess of two hours. In sum, the current servo testing process can consume approximately seventy percent of a disc drive's total test time.

The present invention addresses one or more of these deficiencies.

SUMMARY OF THE INVENTION

A servo test is performed on a disc drive. The servo test includes performing a position error sample (PES) threshold test on tracks in the disc drive and identifying those tracks that fail the PES servo sample test. Zero acceleration path (ZAP) learning is performed on the identified tracks, and is performed on less than all of the tracks on the disc drive. Another PES servo threshold test is performed on the identified tracks to determine whether they pass the servo test, given the ZAP learning process.

DETAILED DESCRIPTION OF ILLUSTRATIVE EMBODIMENTS

Figure 1:
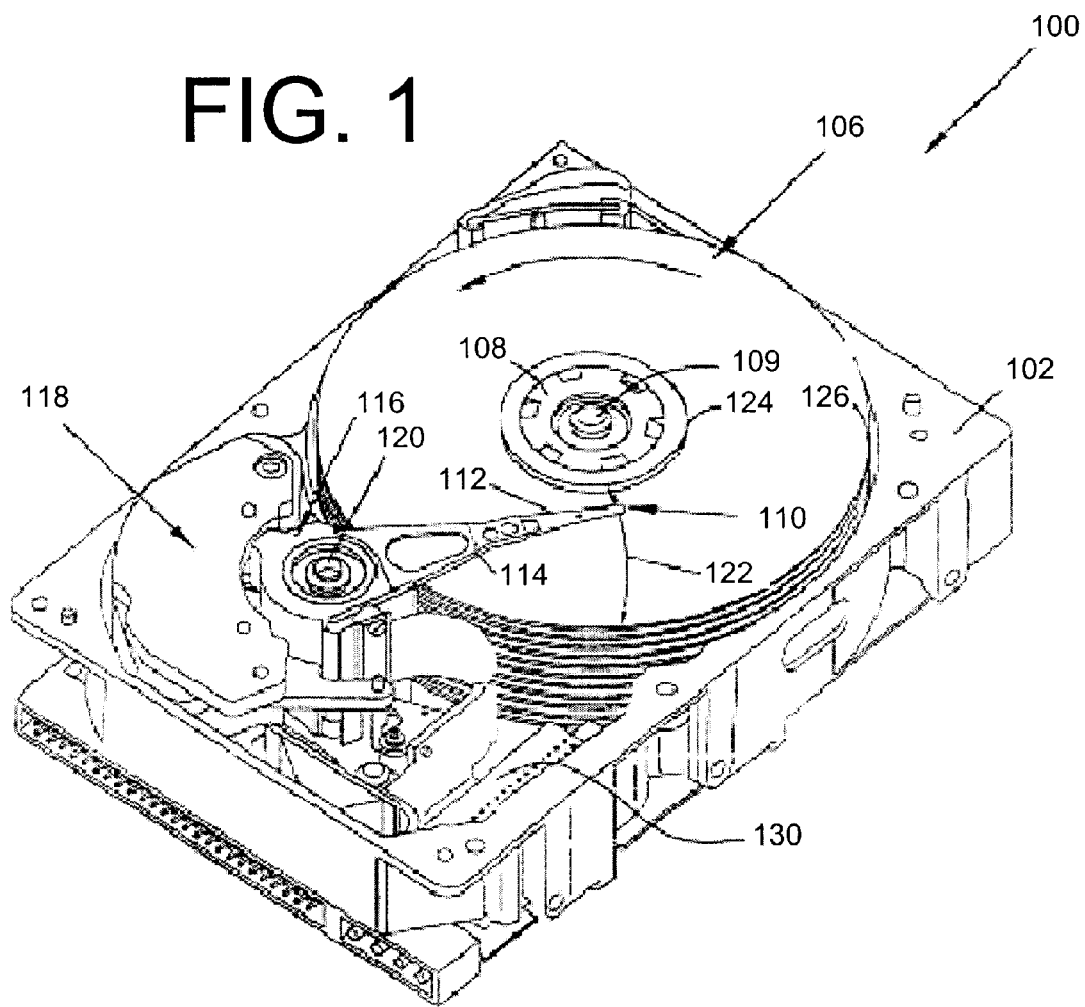
FIG. 1 illustrates a disc drive in accordance with one embodiment of the present invention.

FIG. 1 illustrates an embodiment of a disc drive storage device 100. Disc drive 100 includes a housing 102 that houses a disc pack 126 secured by clamps 124 to a spindle motor 108 and having storage surfaces 105 that are illustratively layers of material (such as magnetic material or optically readable material). The disc pack 126 includes a stack of multiple discs each accessible by a read/write assembly 112 which includes a transducer or head 110. Spindle motor 108 drives rotation of the discs in disc pack 126 in a direction of rotation about spindle 109. As discs 126 are rotated, read/write assembly 112 accesses different rotational locations on the storage surfaces 105 in disc pack 126. Read/write assembly 112 is actuated for radial movement relative to the disc surfaces, such as in a direction indicated by arrow 122, in order to access different tracks (or radial positions) on the disc surfaces. Such actuation of read/write assembly 112 is illustratively provided by a servo system which includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100.

Figure 2:
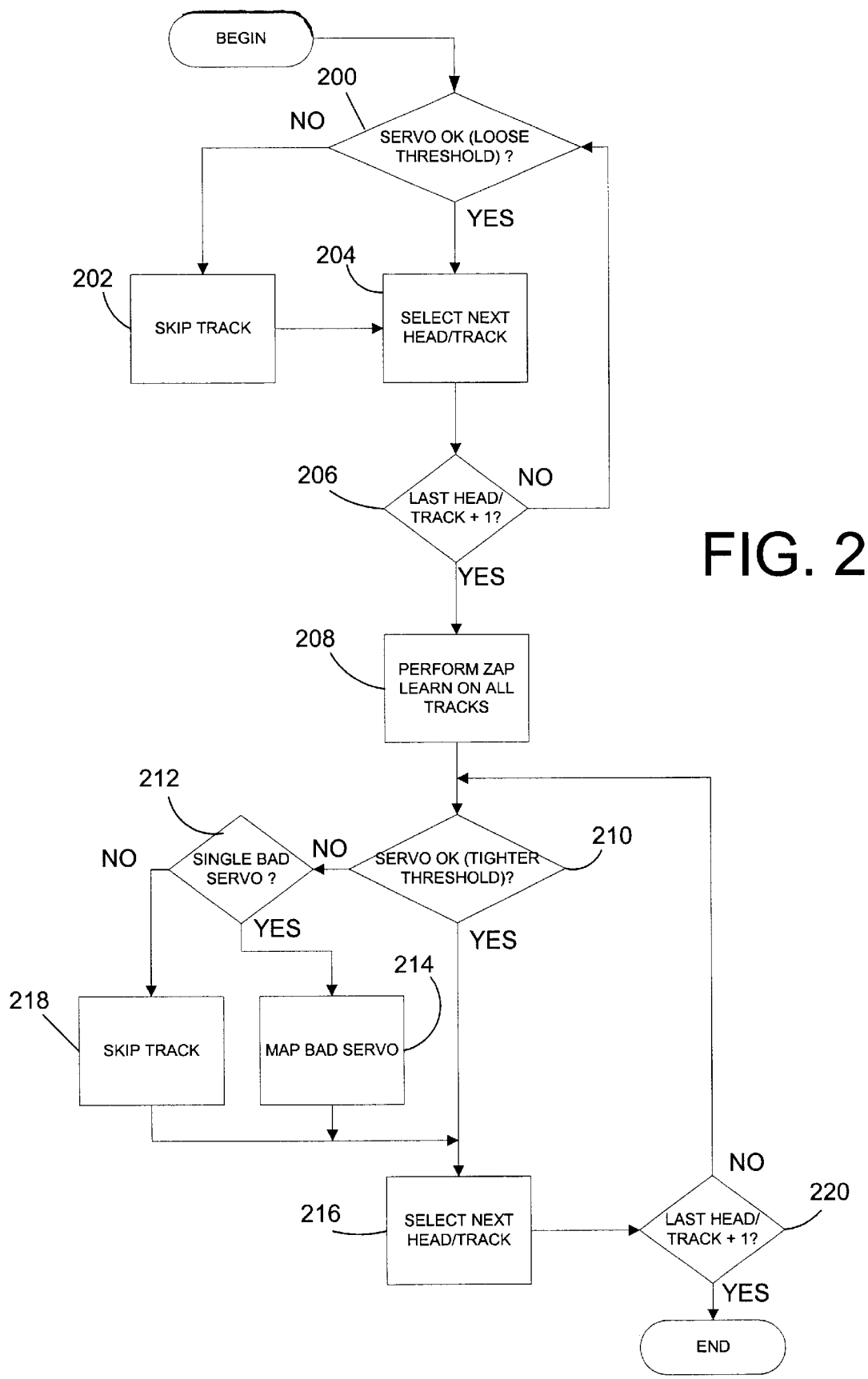
FIG. 2 is a flow diagram illustrating a prior art servo test procedure.

In order to qualify or certify the disc drives 100 for sale, many manufactures require a test of the servo system. FIG. 2 is a flow diagram of a prior art servo test. In order to perform the test, the servo system first selects a head (data transducer or head 110) and track for testing. The head 110 reads the position error samples recorded on the selected track. The position error samples indicate how far from the center of the track the data transducer is as it passes over the position error samples recorded on the track. Using a relatively loose threshold, the servo system reads back the position error samples read from the data transducer and determines whether the current track is satisfactory, in that the head is not too far from track center for the track to be useful. This is indicated by block 200. If the selected track is not adequate, then the track is identified and skipped as indicated by block 202. However, if the track is adequate, then the next track is selected until all tracks associated with the currently selected data head 110 have been tested. Once all tracks have been tested, the next head 110 is selected. This is indicated by block 204.

It is then determined whether the last head or track has already been tested. This is indicated by block 206. If not, the servo test is again performed for the newly selected head or track as indicated by block 200. If so, however, then the process continues with the zero acceleration path (ZAP) learning phase. In the ZAP learning phase, all tracks are subjected to the known ZAP learning process which can take in excess of five hours, depending on the number of discs in the drive. The ZAP learning process may require several revolutions per track to determine RRO and is indicated by block 208.

After the ZAP learning process has been performed on all tracks, the servo test is again conducted, this time using a tighter threshold. This is indicated by block 210. As with the previous servo test, the PES samples are read for each of the tracks with the tighter threshold in place, and taking into account the ZAP learning. If the servo test indicates that the track has failed given the tighter threshold, then the controller determines whether this is simply a single bad servo operation due to written in modulation (such as RRO). This is indicated by block 212. If it is simply a case of one bad servo operation due to RRO, the servo sample is mapped as indicated by block 214, and the next head or track is selected as indicated by block 216.

However, if it is determined that the servo test failure is not due to simply a single bad servo operation at block 212, then the entire track is identified and skipped as indicated by block 218 and the next head or track is selected again as indicated by block 16. This is continued until the last head or track has been subjected to the servo test, as indicated by block 220.

It can thus be seen that the prior art system conducts a first servo test with a loose threshold, then performs ZAP learning on every track, then conducts a second servo test with a looser threshold. However, it has been found that in excess of 80 percent of the disc drives may require very little ZAP learning. For instance, a vast majority of the disc drives may require less than five percent of the drive's capacity to be subjected to ZAP learning in order to help the disc drive pass the servo disc drive test. The remainder of the disc drive's may need no more than approximately ten percent of the drives capacity to be subjected to ZAP learning in order to meet the servo threshold test.

Thus, in accordance one illustrative embodiment of the present invention, ZAP learning is performed only when it is needed. This significantly reduces the test time and makes the drive less sensitive to external vibrations and NRRO which can actually reduce drive servo performance if the drive is subjected to them during ZAP learning.

Figure 3:
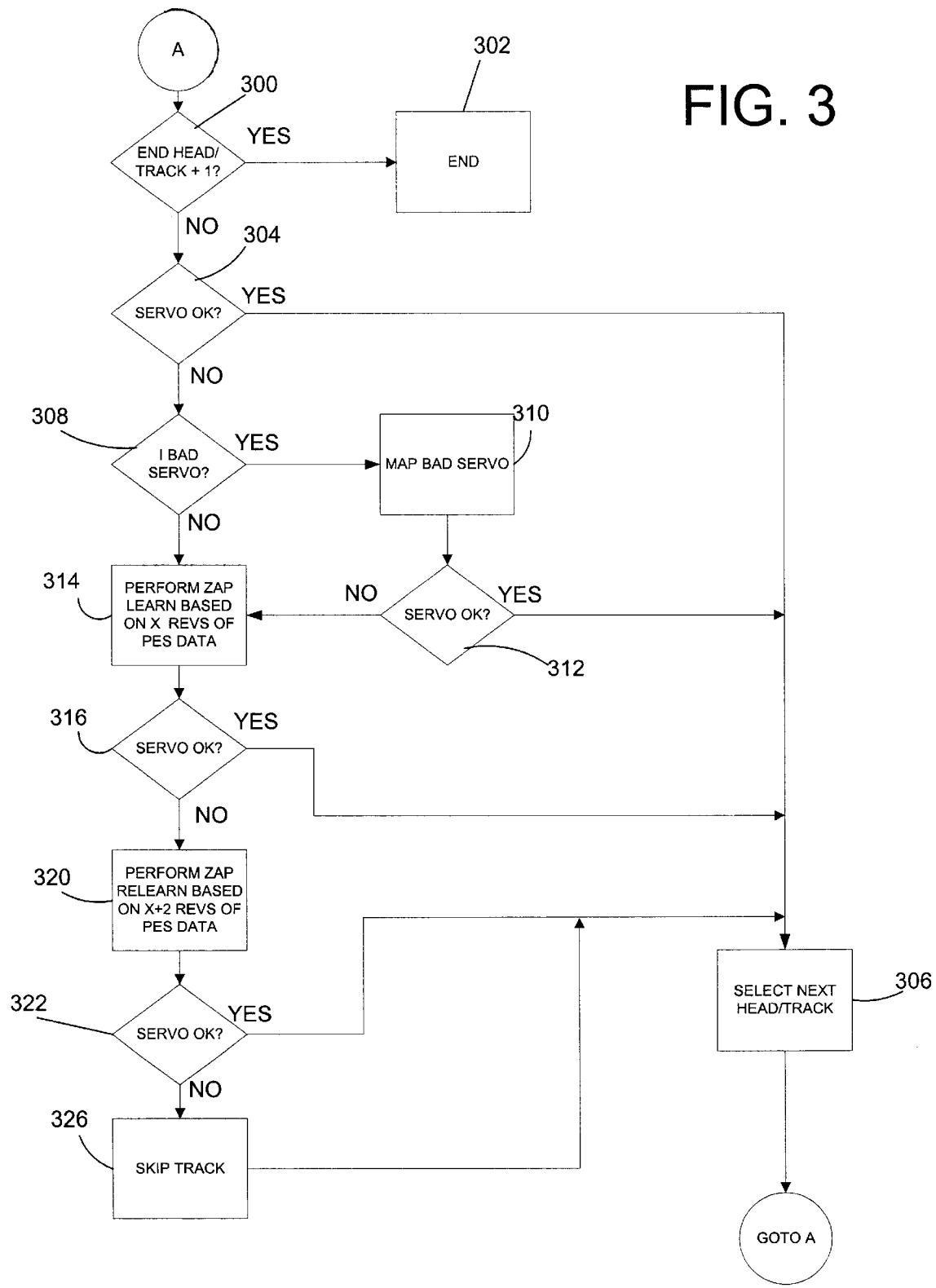
FIG. 3 is a flow diagram illustrating one embodiment of a servo test procedure in accordance with the present invention.

FIG. 3 is a flow diagram illustrating one embodiment of the servo test method in accordance with the present invention. The controller first determines whether all heads and tracks have been tested. This is indicated by block 300. If so, the test is clearly complete. This is indicated by block 302.

However, if all heads and tracks have not been tested, then the servo PES test is performed for the selected head and track. This is indicated by block 304. If the selected head and track pass the servo PES test, then a next head or track is selected as indicated by block 306. Processing reverts to block 300 where it is determined whether all heads and tracks have been tested.

If, however, at block 304, it is determined that the track has failed the servo test, it is determined whether the failure is because of a single bad servo sample, or written in modulation (RRO) or NRRO. This is indicated by block 308. If the test failure is simply due to a single bad servo, the bad servo sample is mapped as indicated by block 310. The track is then verified to ensure that it passes the servo test with the bad servo sample mapped out. This is indicated by block 312. If the track performs adequately with the bad servo sample mapped out, then the next head or track is selected as indicated by block 306 and processing continues at block 300.

If, either at block 308 it is determined that the PES threshold test has been failed due to a reason other than a single bad servo sample, or if at block 312 the disc is not performing adequately even with the bad servo sample mapped out, then that track is subjected to ZAP learning as indicated by block 314. The ZAP learning preferably collects PES data during each of a predetermined number of revolutions, a process known in the art.

In one embodiment, this number was predetermined as X, where X is a weighted average of the number of revs required for each of the last 16 tracks that underwent ZAP learning successfully, rounded to an integer, and decremented by one each 16th time it is calculated. The 16 prior values of X were backfilled with an initial value of 10 revs, so the first ZAP learning used 10 revs within which to perform ZAP learning.

Once the track has been subjected to ZAP learning, the servo PES test is again performed utilizing the ZAP learning, as indicated by block 316, to determine whether the track now meets the servo PES test. If the track does pass the servo test, then the next head or track is selected at block 306 and processing again continues at block 300.

If, at block 316, the track still does not pass the servo PES threshold test, then the track is subjected to a ZAP relearning process as indicated by block 320. The ZAP relearn tries a ZAP learning process essentially similar with that of block 314, but with X+2=12 revs at block 320. The servo PES test is then performed again as indicated by block 322. If the track passes the servo PES test, then the next track or head is selected as indicated by block 306 and processing again continues at block 300. However, if at block 322, the track again fails the servo PES test, even after the ZAP relearn process indicated by block 320, then the entire track is mapped out of the disc drive operation as an unusable track. Thus, the track is skipped during subsequent operation as indicated by block 326. The next head or track is then selected as indicated by block 306 and processing again reverts to block 300.

If the ZAP relearn at 320 is successful, the 16 values then recorded this number of revs, 10 or 12, to become the heaviest-weighted one of the 16 "sliding window" values. (The most recent value was given twice as much weight as the other values, and the oldest of the 16 values drops out of the 16.) This embodiment implements an adaptive scheme to control the number of revs.

Another embodiment of the present invention performs the PES servo test on all tracks simply identifying those tracks which fail the test. The present invention can then be utilized to perform ZAP learning on all the identified tracks (those which failed the original PES servo test). Those tracks can then be re-tested using the PES servo test and ZAP learning can be performed again if they still fail the PES servo test, as indicated by the flow chart in FIG. 3. However, even in this embodiment, the ZAP learning is only performed on the tracks which have failed the PES servo test the first time.

It can thus be seen that in accordance with the present invention, the ZAP learning process is only performed on tracks where it is required (i.e., on tracks which have failed the servo PES test at least once). In accordance with another embodiment of the present invention, the track is still not skipped even if it fails the servo PES test after ZAP learning. Instead, it is subjected to one or more ZAP relearning processes and is again subjected to the servo PES test. It has been found that implementation of the present invention has resulted in greater than a 40 percent reduction in total disc drive test time. The invention has resulted in more than an 80 percent time reduction for servo testing alone. The present invention has also exhibited greater than a five percent yield gain.

In accordance with one embodiment of the present invention, the invention can be implemented as a method of performing a servo test to test a servo system on a disc drive 100. The servo test includes selecting a track (300) and performing a servo position error sample (PES) test on the selected track (304). If the selected test fails the PES test, then a zero acceleration path (ZAP) learning process is performed on the selected track prior to performing the PES test on another track (314). Another PES test is then performed on the selected track (316).

In another embodiment, the test further includes prior to performing ZAP learning (314) determining whether the selected track failed the PES test because of single bad servo sample (308). If so, the ZAP learning process is skipped for the selected track.

In another embodiment, the determining step (308) includes mapping out the single bad servo sample (310) and conducting the PES servo test again (312).

In another embodiment, the invention can further include, if the selected track still fails the PES test (316), repeating the ZAP learning process (320) for the selected track.

After the ZAP relearning process (320) another PES test is performed on the selected track (322). If the selected track still fails the PES test (322), then it is identified as a track which is to be skipped during subsequent operation (326). The test can be repeated for each track on the disc drive, and the disc drive can be qualified based on the results of the PES tests (304, 316, and/or 322).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo test while maintaining substantially the same functionality without departing from the scope and spirit of the present invention. In addition, although the preferred embodiment described herein is directed to a servo system for a disc drive system, it will be appreciated by those skilled in the art that the teachings of the present invention can be applied to other systems, like other data storage systems, without departing from the scope and spirit of the present invention.

What is claimed is:

1. A method of performing a servo test to test a servo system on a disc drive, comprising:

(a) selecting a track;

(b) performing a servo position error sample (PES) test on the selected track; and (c) performing a conditional zero acceleration path (ZAP) learning process on the selected track if the selected track fails the PES test, and otherwise generally not performing the ZAP learning process on the selected track.

2. The method of claim 1 further comprising a step (d) of performing another PES test on the selected track after the performing step (c).

3. The method of claim 1 in which the conditional ZAP learning process includes steps of:
   (c1) evaluating a set of samples generated during the PES test;
   (c2) generating an indication of whether any single one of the samples is likely to have triggered failing the PES test; and
   (c3) mapping out the single sample if the indication is positive, and otherwise generally not mapping out any of the samples.

4. The method of claim 1 in which the conditional ZAP learning process includes steps of:
   (c1) evaluating a set of samples generated during the PES test;
   (c2) generating an indication of whether all of the samples are acceptable; and
   (c3) re-reading the selected track several times if the indication is positive, and otherwise generally not re-reading the selected track several times.

5. The method of claim 4 in which the re-reading step (c3) includes a step (c3A) of calculating how many times the track is to be re-read as a weighted average of several values each indicative of how many times a respective recent track was re-read for a successful ZAP learning process.

6. The method of claim 2 wherein, if in the step (d) the selected track still fails the PES test, further comprising:
   (g) repeating the ZAP learning process for the selected track.

7. The method of claim 6 and further comprising:
   (h) after step (g), performing another PES test on the selected track.

8. The method of claim 2 and further comprising:
   (j) certifying the disc drive based on results of the PES tests in the steps (b) and (d).

9. A method of performing a servo test on a disc drive, comprising:
   (a) performing a position error sample (PES) servo test on a multiplicity of data tracks in the disc drive, identifying those of the tracks that fail the PES servo test;
   (b) performing zero acceleration path (ZAP) learning on the identified tracks and less than all of the tracks in the disc drive; and
   (c) performing another PES servo test on the identified tracks.

10. The method of claim 9 wherein the performing step (b) comprises:
    (b1) performing ZAP learning on substantially only the identified tracks.

11. The method of claim 9 and further comprising:
    (d) determining whether the identified tracks failed the PES test because of a single bad servo sample; and
    (e) if so, skipping the ZAP learning step (c) for those tracks.

12. The method of claim 11 wherein the determining step (d) comprises:
    (d1) mapping out the single bad servo sample; and
    (d2) performing another PES test on the track.

13. The method of claim 9 wherein, if in the step (c) the track still fails the PES test, further comprising:
    (f) repeating the ZAP learning process for the track.

14. The method of claim 13 and further comprising:
    (g) after step (f), performing another PES test on the track.

15. The method of claim 14 and further comprising:
    (h) if at step (g) the selected track fails the PES test, identifying the selected track as a track to skip during subsequent operation.

16. The method of claim 9 in which the disc drive contains many thousands of user data tracks, substantially all of which comprise the multiplicity of data tracks upon which step (a) is performed.

17. The method of claim 9 and further comprising:
    (d) certifying the disc drive based on data from the PES tests in the steps (a) and (c).

18. A method of manufacturing a disc drive containing many data tracks, comprising:
    (a) building the drive; and
    (b) a step for qualifying the drive including performing a zero acceleration path (ZAP) learning process on less than all of the data tracks.

19. The method of claim 18 wherein the step for qualifying (b) comprises steps of:
    (b1) performing a PES servo test on substantially all of the tracks;
    (b2) identifying which of the tested tracks fail the PES servo test; and
    (b3) performing the ZAP learning process on at least some of the identified tracks, but not on all of the tested tracks.

20. The method of claim 18 wherein the ZAP learning process is performed on less than half of the data tracks.

* * * * *